(12) United States Patent
Takada et al.

(10) Patent No.: US 11,568,476 B2
(45) Date of Patent: Jan. 31, 2023

(54) INFORMATION PROVIDING APPARATUS, INFORMATION PROVIDING SYSTEM, AND INFORMATION PROVIDING METHOD

(71) Applicant: HONDA MOTOR CO., LTD., Tokyo (JP)

(72) Inventors: Sho Takada, Wako (JP); Nobuyuki Sasaki, Wako (JP); Mitsuhiro Ito, Wako (JP); Mio Oshima, Wako (JP); Yoshihiro Matsunaga, Wako (JP); Ryo Oshima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 30 days.

(21) Appl. No.: 17/017,243

(22) Filed: Sep. 10, 2020

(65) Prior Publication Data

US 2020/0410579 A1 Dec. 31, 2020

Related U.S. Application Data

(63) Continuation of application No. PCT/JP2018/043827, filed on Nov. 28, 2018.

(30) Foreign Application Priority Data

Mar. 20, 2018 (JP) .............................. JP2018-052593

(51) Int. Cl.
*G06Q 30/06* (2012.01)
*G06F 16/22* (2019.01)
*G06F 1/28* (2006.01)

(52) U.S. Cl.
CPC ........... *G06Q 30/0645* (2013.01); *G06F 1/28* (2013.01); *G06F 16/22* (2019.01)

(58) Field of Classification Search
CPC ........... G06Q 30/0645; G06Q 30/0639; G06Q 30/06; G06F 16/22; G06F 1/28; G06F 1/26

See application file for complete search history.

(56) References Cited

U.S. PATENT DOCUMENTS 10,014,701 B2 7/2018 Toya
10,482,472 B2 11/2019 Takatsuka et al.
(Continued)

FOREIGN PATENT DOCUMENTS

JP 2006331405 A 12/2006
JP 2009181176 A 8/2009
(Continued)

OTHER PUBLICATIONS

Y. Miao, Q. Jiang and Y. Cao, "Battery switch station modeling and its economic evaluation in microgrid," 2012, 2012 IEEE Power and Energy Society General Meeting, pp. 1-7 (Year: 2012).*
(Continued)

*Primary Examiner* — Sarah M Monfeldt
*Assistant Examiner* — Michael J. Monaghan
(74) *Attorney, Agent, or Firm* — Thomas | Horstemeyer, LLP

(57) ABSTRACT

An information providing apparatus provides information concerning a lendable electric power supply device. More specifically, the information providing apparatus for providing information via a network in response to a request from a terminal, performs the following processes. The apparatus receives, from the terminal via the network, an information request concerning a lendable electric power supply device configured to supply electric power, acquires information concerning electric power that can be provided by the electric power supply device and a lending price of the electric power supply device by communicating with the (Continued)

electric power supply device via the network. The apparatus further edits, based on the acquired information, information to be provided to the terminal that has issued the information request, and transmits the edited information to the terminal that has issued the information request via the network.

7 Claims, 7 Drawing Sheets

(56) References Cited

U.S. PATENT DOCUMENTS

| | | | |
|---|---|---|---|
| 10,518,661 B2 | 12/2019 | Haneda | |
| 2010/0121588 A1* | 5/2010 | Elder | H01M 10/48 702/63 |
| 2011/0050239 A1* | 3/2011 | Hoshino | G06Q 30/06 324/435 |
| 2011/0191265 A1* | 8/2011 | Lowenthal | B60L 53/665 705/412 |
| 2012/0038473 A1* | 2/2012 | Fecher | H02J 7/005 340/455 |
| 2013/0030696 A1* | 1/2013 | Wu | G06Q 30/0261 701/431 |
| 2013/0066791 A1* | 3/2013 | Sakamoto | H02J 3/32 705/307 |
| 2015/0134546 A1* | 5/2015 | Penilla | B60L 53/31 705/305 |
| 2016/0268822 A1 | 9/2016 | Toya | |
| 2017/0066342 A1* | 3/2017 | Butler | B60L 53/68 |
| 2018/0012197 A1* | 1/2018 | Ricci | G05D 1/0011 |
| 2018/0047031 A1 | 2/2018 | Takatsuka et al. | |
| 2018/0240186 A1* | 8/2018 | Maeki | G06Q 50/02 |
| 2018/0253789 A1 | 9/2018 | Takatsuka et al. | |
| 2018/0276741 A1* | 9/2018 | Groff | G06Q 10/06 |
| 2018/0300968 A1* | 10/2018 | Kutkut | B60L 53/53 |
| 2019/0152340 A1 | 5/2019 | Haneda | |

FOREIGN PATENT DOCUMENTS

| | | | |
|---|---|---|---|
| JP | 2011096233 A | | 5/2011 |
| JP | 2012244656 A | | 12/2012 |
| JP | 2013104680 A | | 5/2013 |
| JP | 2013130963 A | | 7/2013 |
| JP | 2013247854 A | | 12/2013 |
| JP | 2015216787 A | | 12/2015 |
| JP | 2016171061 A | | 9/2016 |
| JP | 2016171661 A | | 9/2016 |
| JP | 2017091425 A | | 5/2017 |
| JP | 2018018454 A | | 2/2018 |
| WO | 2013179930 A1 | | 12/2013 |
| WO | 2016143373 A1 | | 9/2016 |
| WO | 2017086173 A1 | | 5/2017 |
| WO | 2018021573 A1 | | 2/2018 |
| WO | 2019181068 A1 | | 9/2019 |
| WO | 2019181069 A1 | | 9/2019 |
| WO | 2019181070 A1 | | 9/2019 |

OTHER PUBLICATIONS

International Search Report for PCT/JP2018/043826 dated Jan. 8, 2019.

International Search Report and Written Opinion for PCT/JP2018/043827 dated Feb. 26, 2019.

International Search Report for PCT/JP2018/043828 dated Feb. 26, 2019.

IPRP for PCT/JP2018/043828 mailed Aug. 20, 2019.

U.S. Appl. No. 17/017,232, filed Sep. 10, 2020 entitled "Information Providing Apparatus, Information Providing System, and Information Providing Method" (Related Case).

U.S. Appl. No. 17/017,250, filed Sep. 10, 2020 entitled "Information Providing Apparatus, Information Providing System, and Information Providing Method" (Related Case).

* cited by examiner

| ELECTRIC POWER SUPPLY DEVICE ID | LENDING/ BORROWING INFORMATION | DATE | POSITION | SPECIFICATION (Wh) | REMAINING CAPACITY (Wh) |
|---|---|---|---|---|---|
| E001329 | ... | YYMMDD | AKASAKA 5 CHOME | 377 | 300 |
| E012312 | ... | YYMMDD | AKASAKA 1 CHOME | 562 | 530 |
| E012111 | ... | YYMMDD | AZABU 3 CHOME | 635 | 400 |

FIG. 4A

40 —
```
LENDING DATE (YYMMDD)
LENDING DESTINATION (USER ID)
LENDING PRICE (¥)
POWER USAGE (Wh)

LENDING DATE (YYMMDD)
LENDING DESTINATION (USER ID)
LENDING PRICE (¥)
POWER USAGE (Wh)
```

FIG. 4B

40 —
```
LENDING DATE (YYMMDD)
LENDING DESTINATION (USER ID)
LENDING PRICE (¥)
PRESENT PRICE (¥)
POWER USAGE (Wh)

LENDING DATE (YYMMDD)
LENDING DESTINATION (USER ID)
LENDING PRICE (¥)
PRESENT PRICE (¥)
POWER USAGE (Wh)
```

FIG. 4C

40 —
```
LENDING DATE (YYMMDD)
LENDING DESTINATION (USER ID)
LENDING PRICE (¥)

LENDING DATE (YYMMDD)
LENDING DESTINATION (USER ID)
LENDING PRICE (¥)
```

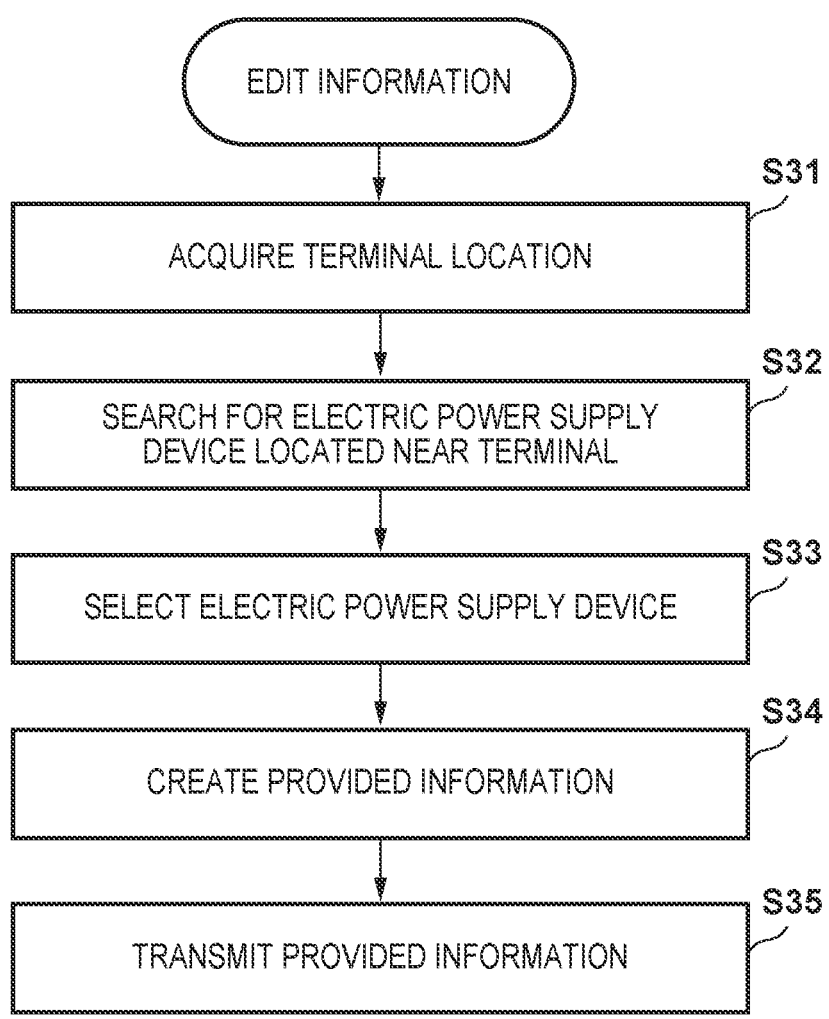

INFORMATION PROVIDING APPARATUS, INFORMATION PROVIDING SYSTEM, AND INFORMATION PROVIDING METHOD

CROSS-REFERENCE TO RELATED APPLICATION(S)

This application is a continuation of International Patent Application No. PCT/JP2018/043827 filed on Nov. 28, 2018, which claims priority to and the benefit of Japanese Patent Application No. 2018-052593 filed on Mar. 20, 2018, the entire disclosures of which are incorporated herein by reference.

BACKGROUND OF THE INVENTION

Field of the Invention

The present invention relates to an information providing apparatus, an information providing system, and an information providing method and, more particularly, to an information providing apparatus, an information providing system, and an information providing method for providing, for example, the arrangement situation of electric storage devices to a user via a network.

Description of the Related Art

There has conventionally been proposed a system that provides, to a user who needs electric power, for example, a person who is driving an electric vehicle (EV), information about locations of facilities such as charging stations capable of supplying electric power to the electric vehicle. For example, Japanese Patent Laid-Open No. 2013-104680 proposes a system that checks the remaining battery amount of an EV and charging stations reachable using the remaining battery amount and displays the result on the display of the EV.

However, the above-described relate art has proposed a system that supplies electric power itself to an appliance held by a user, and an appliance capable of supplying electric power is not provided or lent to the user.

On the other hand, it is sometimes convenient for the user to borrow an appliance configured to supply electric power or an electric storage device itself and receive electric power supply via the appliance or the device. For example, this corresponds to a case in which the user wants to use an electric generator or an electric storage device when going to auto-camping. In this case, it is desirable to quickly acquire information representing where and from whom the user can borrow such an electric generator or electric storage device.

SUMMARY OF INVENTION

The present invention has been made in consideration of the above-described prior art, and has as its objective to provide an information providing apparatus, an information providing system, and an information providing method capable of providing information about a lendable electric power supply device.

In order to achieve the above-described objective, an information providing apparatus according to the present invention has the following arrangement.

That is, according to one aspect of the present invention, there is provided an information providing apparatus for providing information via a network in response to a request from a terminal, comprising a reception unit configured to receive, from the terminal via the network, an information request concerning a lendable electric power supply device configured to supply electric power, an acquisition unit configured to acquire information concerning electric power that can be provided by the electric power supply device and a lending price of the electric power supply device by communicating with the electric power supply device via the network, an editing unit configured to edit, based on information acquired by the acquisition unit, information to be provided to the terminal that has issued the information request, and a transmission unit configured to transmit, via the network, the information edited by the editing unit to the terminal that has issued the information request.

According to another aspect of the present invention, there is provided an information providing system comprising the above-described information providing apparatus, a terminal connected to the information providing apparatus via a network, and an electric power supply device connected to the information providing apparatus via the network.

According to still another aspect of the present invention, there is provided an information providing method in an information providing apparatus for providing information via a network in response to a request from a terminal, comprising receiving, from the terminal via the network, an information request concerning a lendable electric power supply device configured to supply electric power, acquiring information concerning electric power that can be provided by the electric power supply device and a lending price of the electric power supply device by communicating with the electric power supply device via the network, editing, based on the acquired information, information to be provided to the terminal that has issued the information request, and transmitting, via the network, the edited information to the terminal that has issued the information request.

Hence, according to the arrangements of the above aspects of the present invention, it is possible to provide information concerning a lendable electric power supply device to a terminal that has requested the information.

Further features of the present invention will become apparent from the following description of exemplary embodiments (with reference to the attached drawings).

BRIEF DESCRIPTION OF DRAWINGS

FIG. 4A is a view showing lending/borrowing information stored in a database provided in an information providing apparatus;

FIG. 4B is a view showing lending/borrowing information stored in a database provided in an information providing apparatus:

FIG. 4C is a view showing lending/borrowing information stored in a database provided in an information providing apparatus;

FIG. 6B is a flowchart showing details of information generation processing.

DESCRIPTION OF EMBODIMENTS

A preferred embodiment of the present invention will now be described in more detail with reference to the accompanying drawings.

<Arrangement of System (FIG. 1)>

Figure 1:
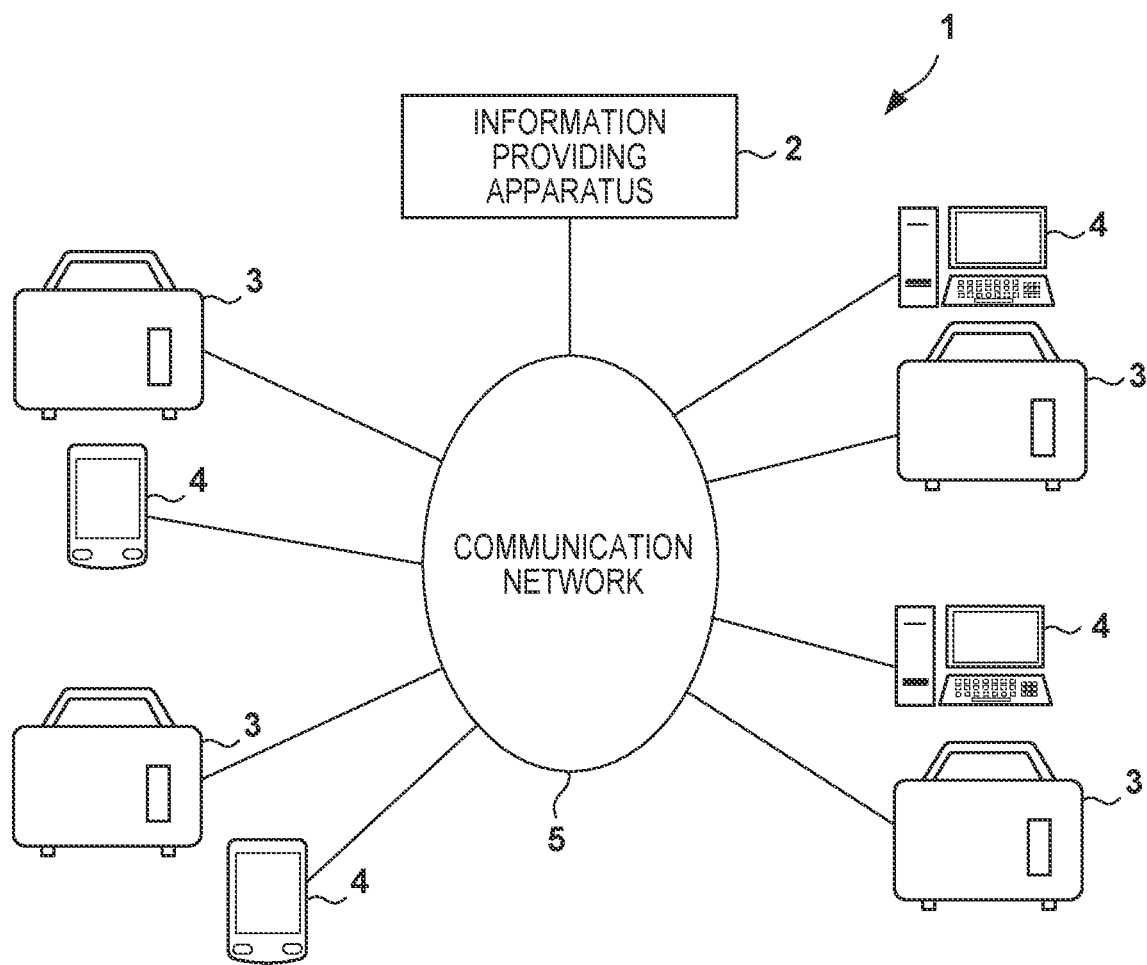
FIG. 1 is a block diagram showing the outline of the arrangement of an information providing system according to a representative embodiment of the present invention.

FIG. 1 is a block diagram showing the outline of the arrangement of an information providing system 1 according to a representative embodiment of the present invention.

The information providing system 1 shown in FIG. 1 includes, for example, an information providing apparatus 2 communicably connected via a communication network 5 such as the Internet, a plurality of electric power supply devices 3, and a plurality of terminals 4. In the example shown in FIG. 1, four electric power supply devices 3 are shown, and a number of electric power supply devices 3 can form the system 1.

The information providing apparatus 2 is a computer functioning as an information providing server (to be referred to as a server hereinafter) in the information providing system 1. The electric power supply device 3 is a device that supplies electric power to an electric appliance. In this embodiment, the electric power supply device is assumed to be a movable electric power supply device, but may be a stationary electric power supply device. The movable electric power supply device can be carried to a use site in accordance with a user's application purpose such as leisure, business, or emergency. The electric power supply device 3 can be either a possession of an individual or a corporation or a rental article.

The terminal 4 is a computer used by the user of the electric power supply device 3, and is, for example, a personal computer or a portable terminal such as a smartphone or a tablet. The terminal 4 includes a display or a touch panel, and has a wireless communication function such as WiFi®, Bluetooth®, or LTE. In this embodiment, information to be provided to the user of the terminal 4 is transmitted to the terminal 4 via the information providing apparatus 2 (server). However, depending on the function or installation environment of the electric power supply device 3, the information can directly be transmitted from the electric power supply device 3 to the terminal 4. Alternatively, the user may select the server 2 or the electric power supply device 3 as the information access destination.

In the information providing system 1, the information providing apparatus 2 collects a remaining capacity or a lending price from the electric power supply device 3 via the communication network 5 such as the Internet and provides, based on the collected information, information including the place or the remaining capacity of the electric power supply device 3 or lending information to the terminal 4. Based on the provided information, the terminal 4 can understand the type and location of an apparatus preferable for the user who borrows the apparatus.

The information providing apparatus 2 can be operated by, for example, a rental trader of the electric power supply device 3. The trader can obtain information concerning the actual state of the availability of the electric power supply device 3 and can use the information as a material for business in the future.

<Electric Power Supply Device (FIG. 2)>

Figure 2:
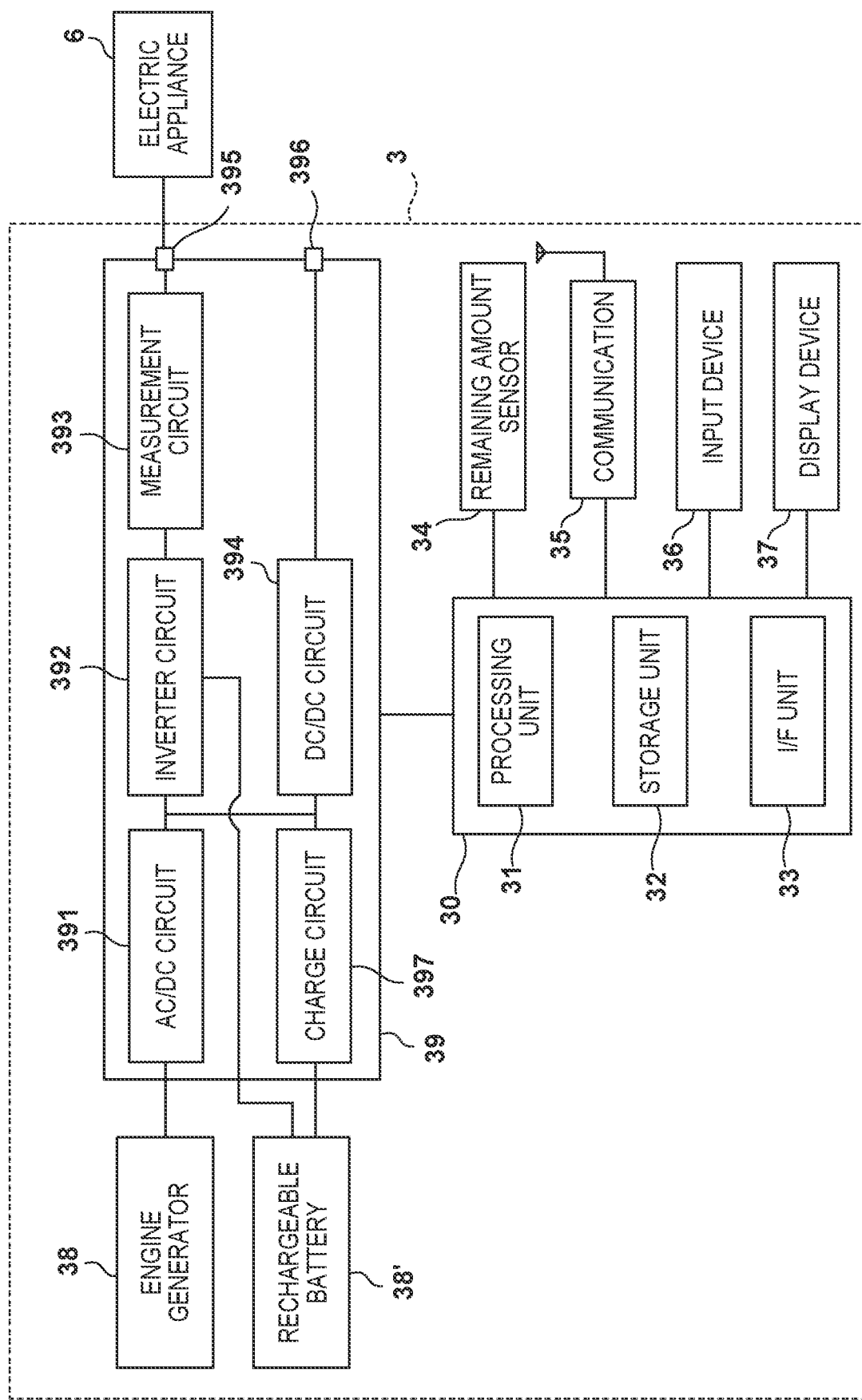
FIG. 2 is a block diagram showing the arrangement of an electric power supply device.

FIG. 2 is a block diagram showing the arrangement of the electric power supply device 3.

The electric power supply device 3 according to this embodiment is an electric power supply device including both an engine generator 38 and a rechargeable battery 38'. Hence, the electric power supply device 3 can supply electric power stored in the rechargeable battery 38' to an electric appliance 6 even after the fuel of the engine generator 38 has run out. The engine generator 38 is driven by fuel and generates AC power. The fuel is, for example, gasoline, liquefied petroleum gas, hydrogen, or the like. The rechargeable battery 38' is, for example, a secondary battery such as a lithium ion battery.

A power supply circuit 39 is a circuit that transforms a voltage generated by the engine generator 38 into a predetermined alternating current or direct current. An AC/DC circuit 391 includes a rectifying smoothing circuit that rectifies and smoothes the alternating current generated by the engine generator 38, and the like. An inverter circuit 392 is a circuit that transforms the direct current output from the AC/DC circuit 391 into a stable alternating current having a predetermined frequency. The inverter circuit 392 also transforms the direct current generated by the AC/DC circuit 391 or the direct current supplied from the rechargeable battery 38' into an alternating current. The rechargeable battery 38' outputs a DC voltage of, for example, 48 V to the inverter circuit 392 or a DC/DC circuit 394.

A measurement circuit 393 includes a current sensor and a voltage sensor, measures an AC voltage and an alternating current supplied from the inverter circuit 392 to the electric appliance 6 connected to an AC outlet 395, and outputs the measurement result to a control circuit 30. The electric appliance 6 that can be driven by AC power is detachably connected to the AC outlet 395. If the application purpose of the electric power supply device 3 is leisure, examples of the electric appliance 6 are electric loads such as a cooking device, an air conditioner, a television, a lighting device, and a dryer. Examples of cooking devices are an electric griddle, a kettle, a microwave oven, a grill, and a mixer. If the application purpose of the electric power supply device 3 is business, examples are electric loads such as an electric tool, a large lighting device, and a compressor.

In this arrangement, the measurement circuit 393 measures information concerning the life of the rechargeable battery 38', charge/discharge information, charge/discharge frequency, the presence/absence of overcharge/overdischarge, the remaining amount of the rechargeable battery 38' at the start of charge, the remaining amount at the end of charge, and the like.

A DC/DC circuit 394 transforms the level of a DC voltage output from the AC/DC circuit 391 and supplies an operating voltage to the control circuit 30 or the like, or outputs the voltage from a DC outlet 396. The electric appliance 6 that can be driven by DC power is detachably connected to the DC outlet 396.

A charge circuit 397 charges the rechargeable battery 38' based on the electric power generated by the engine generator 38.

The control circuit 30 is a circuit that controls the electric power supply device 3. The control circuit 30 includes a processing unit 31, a storage unit 32, and an/F (interface) unit 33. The processing unit 31 is a processor represented by a CPU or an MPU, and executes programs stored in the storage unit (memory) 32. The storage unit 32 is a storage device such as a RAM, a ROM, an SSD (Solid State Disk), or a hard disk. In addition to the programs to be executed by the processing unit 31, various kinds of data are stored in the storage unit 32. The I/F unit 33 relays transmission/reception of signals between an external device and the processing unit 31.

A remaining amount sensor 34 detects the remaining amount of the fuel of the engine generator 38 and the remaining capacity of the rechargeable battery 38'. The remaining amount sensor 34 can be provided in a fuel tank that stores fuel or in the rechargeable battery 38'. The fuel efficiency of the engine generator 38 can be calculated based on the fuel consumption detected by the remaining amount sensor 34 and the power consumption of the electric appliance 6 measured by the measurement circuit 393.

A communication device 35 is a wireless communication device that performs information communication with the information providing apparatus 2 via the communication network 5. Note that the communication device 35 may be a wired communication device. An input device 36 is a device that accepts operation input of the owner of the electric power supply device 3, and includes, for example, a plurality of switches or a piezoelectric touch panel. A display device 37 is a device that displays information to the user of the electric power supply device 3, and is, for example, a light emitting element such as an LCD or an LED.

The processing unit 31 transmits the detection result of the remaining amount sensor 34 or the measurement result of the measurement circuit 393 as the availability information of the electric power supply device 3 to the information providing apparatus 2 by the communication device 35. Based on the actual detection result, the information of the electric power supply device is supplied from the information providing apparatus 2 or the electric power supply device 3 to the user of the terminal 4. The measurement result of the measurement circuit 393 can be used as information concerning the type of the electric appliance 6 connected to the AC outlet 395 of the electric power supply device 3, and can particularly be used to estimate the type. Electric power supplied to the electric appliance 6 exhibits a waveform characterized by the type of the electric appliance 6. By the feature amount, the type of the connected electric appliance 6 can be estimated.

<Another Arrangement Example of Electric Power Supply Device>

The electric power supply device 3 shown in FIG. 2 includes both the engine generator 38 and the rechargeable battery 38'. However, the present invention is not limited to this. For example, the electric power supply device 3 may include only the rechargeable battery 38' as the electric power supply source without including the engine generator 38, the AC/DC circuit 391, and the charge circuit 397.

<Information Providing Apparatus (FIGS. 3 to 4C)>

Figure 3:
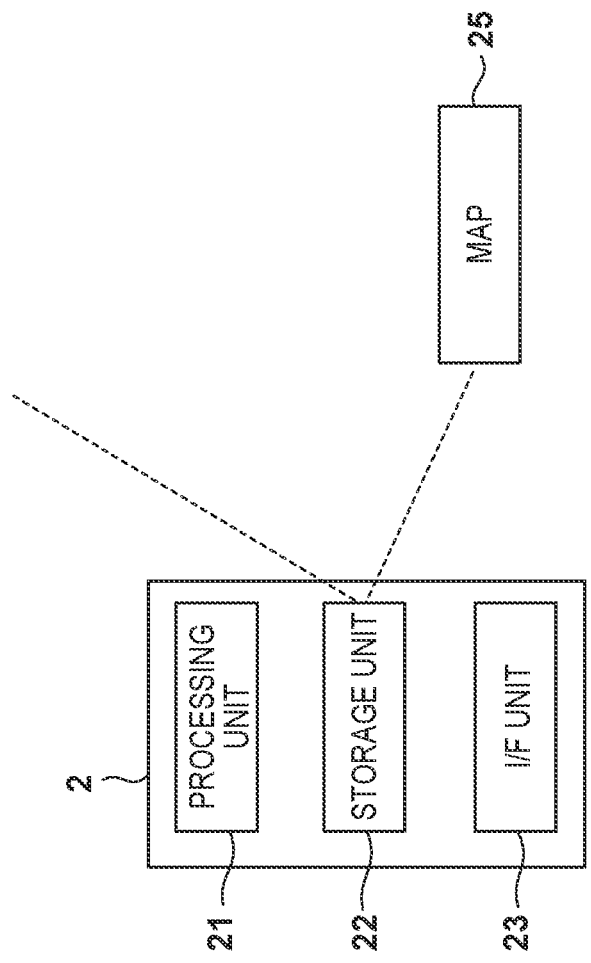
FIG. 3 is a block diagram showing the schematic arrangement of an information providing apparatus.

FIG. 3 is a block diagram showing the schematic arrangement of the information providing apparatus 2.

The information providing apparatus 2 includes a processing unit 21, a storage unit 22, and an IF (interface) unit 23. The processing unit 21 is a processor represented by a CPU, and executes programs stored in the storage unit 22. The I/F unit 23 relays transmission/reception of signals between an external device and the processing unit 21. The I/F unit 23 includes a wired or wireless communication interface capable of communicating with the electric power supply device 3 or the terminal 4 via the communication network 5. The storage unit 22 is a storage device such as a RAM, a ROM, an SSD, or a hard disk.

In addition to the programs to be executed by the processing unit 31, various kinds of data are stored in the storage unit 22. In the example shown in FIG. 3, databases 24 and 25 are shown as the data stored in the storage unit 22.

The database 24 is a database that accumulates data concerning the electric power supply device 3.

"Electric power supply device ID" is an identifier assigned in advance to specify each electric power supply device 3. "Specifications" includes information concerning the specifications of the electric power supply device 3, for example, the model, the rated output, the continuous operable time, and the like. "Remaining capacity" includes the current remaining capacity of the electric power supply device 3. "Location" indicates the current location of the electric power supply device 3, and "date" indicates the date/time when the electric power supply device 3 was installed in the location represented by "location". "Lending/borrowing information" includes information representing the history of lending and borrowing of the electric power supply device 3.

The database 25 is a database that accumulates a map (map information). Based on position information transmitted from the electric power supply device 3, the processing unit 21 collates the position of the electric power supply device 3, which is to be provided to the terminal 4, with the map information and provides correct position information to the user of the terminal 4.

FIGS. 4A to 4C are views showing lending/borrowing information stored in the database 24 provided in the information providing apparatus 2.

In the database 24, lending/borrowing information is managed for each electric power supply device.

The lending/borrowing information is generated every time lending is performed once, and the lending/borrowing history is accumulated. The format of the lending/borrowing history is not limited to one format, as shown in FIGS. 4A to 4C. As shown in FIG. 4C, every time lending occurs, at least pieces of information of the lending date, lending destination, and lending price are generated and stored time-serially. In addition to these pieces of information, used electric power consumed in the lending may be stored, as shown in FIG. 4A. Also, in addition to these pieces of information, the first offered lending price may be included to show the history of a lending negotiation, as shown in FIG. 4B.

Note that as for the arrangement of the terminal 4, an off-the-shelf portable terminal suffices, and a description thereof will be omitted. However, it is assumed that an application configured to cause the user to acquire the information of the electric power supply device via the network is downloaded in the portable terminal. In addition, the portable terminal can acquire its position information via a GPS. Map information is provided from the information providing apparatus 2 or another information supply source, and the portable terminal can display a map and the position information.

Processing of providing information of a lendable electric power supply device, which is executed by the information providing system with the above-described arrangement, will be described next with reference to a flowchart.

<Processing Examples>

Figure 5:
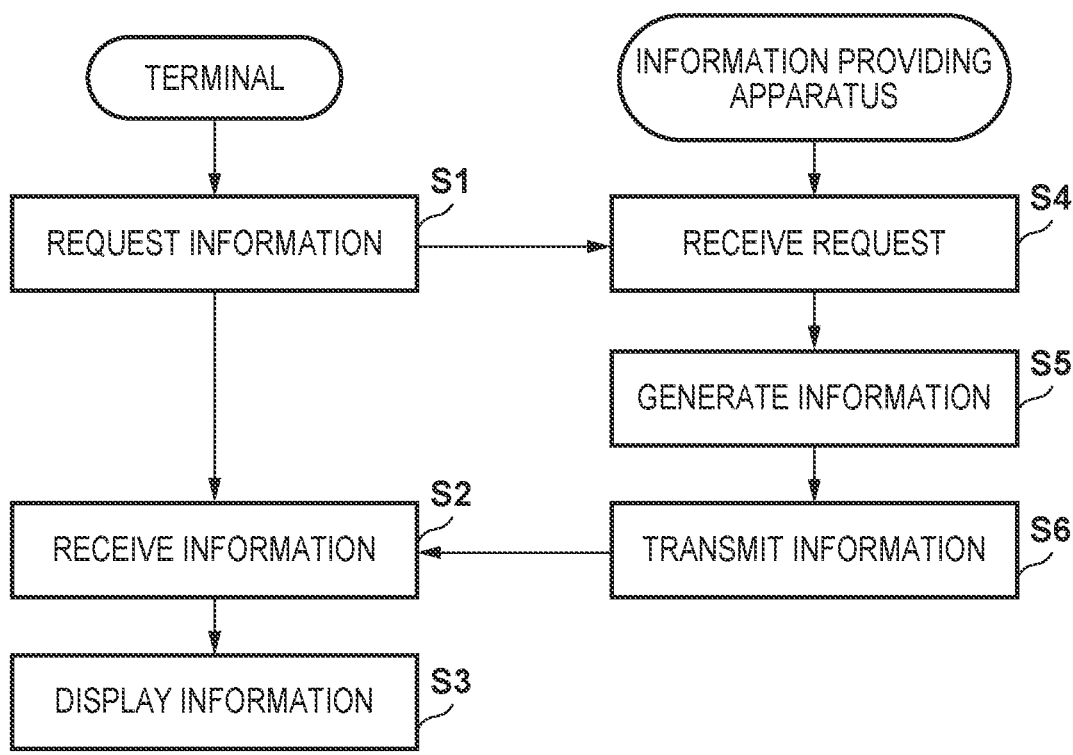
FIG. 5 is a flowchart showing the outline of overall processing of information providing executed by the information providing system.

FIG. 5 is a flowchart showing the outline of overall processing of information providing executed by the information providing system 1.

According to FIG. 5, first, in step S1, the user of the terminal 4 activates the application, and requests the information providing apparatus (server) 2 to provide the information of a lendable electric power supply device via the communication network 5. The request includes the position information of the terminal 4 itself. For the request, the information providing apparatus 2 receives the request in step S4, and generates information to be provided to the terminal 4 in step S5. In step S6, the generated information is transmitted to the terminal 4 that has transmitted the request via the communication network 5.

On the other hand, the terminal 4 receives the transmitted information in step S2, and displays the received information (the information of the lendable electric power supply device) in step S3. In this information display, the positions, remaining capacities, lending prices, and the like of (a plurality of) electric power supply devices that exist in the neighborhood of the terminal 4 and are lendable are displayed in a table format on the display of the terminal 4.

In addition, if the terminal 4 can display a map based on the map information, the position of the terminal 4 itself and the positions of lendable electric power supply devices existing in the neighborhood may be displayed on the map. When the icon of a displayed electric power supply device is tapped, pieces of detailed information such as the correct position, the remaining capacity, and the lending price of the tapped electric power supply device are preferably displayed.

Generation processing of information to be provided to the terminal will be described next.

Figure 6A:
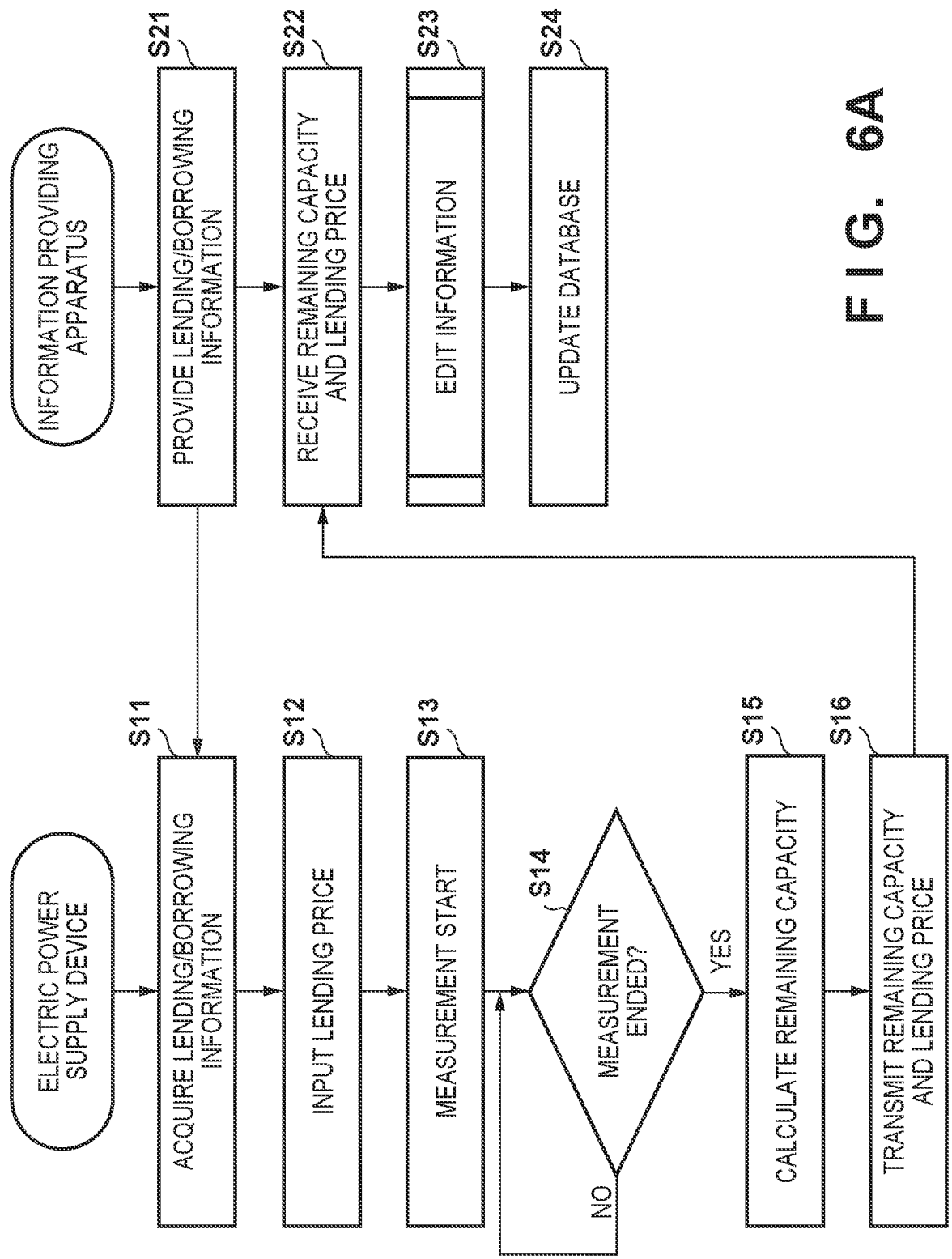
FIG. 6A is a flowchart showing details of information generation processing.

FIGS. 6A and 6B are flowcharts showing details of information generation processing.

According to FIG. 6A, upon receiving an information request in step S4 shown in FIG. 5, the information providing apparatus 2 accesses the database 24 in step S21 to acquire lending/borrowing information concerning various electric power supply devices, and provides the lending/borrowing information to the electric power supply device 3 via the communication network 5. The provided lending/borrowing information includes a lending price, used electric power, and the like as shown in FIGS. 4A and 4B.

As the electric power supply device to which the lending/borrowing information is provided, an electric power supply device located near the terminal 4 is preferably selected based on the place of the electric power supply device stored in the database 24 in advance and the position information of the terminal 4 that has issued the information request. Instead of making such selection, all electric power supply devices managed by the database 24 may be selected as targets.

In step S11, the electric power supply device 3 acquires the provided lending/borrowing information, and displays the acquired lending/borrowing information on the display device 37 of the electric power supply device 3. In step S12, the user of the electric power supply device 3 inputs a lending price desired by him/her based on the displayed lending/borrowing information. Furthermore, in steps S13 and S14, the measurement circuit 393 measures information about the remaining capacity of the rechargeable battery 38'. In step S15, based on the measurement result of the measurement circuit 393, the processing unit 31 calculates the remaining capacity of the rechargeable battery 38'. In step S16, the calculated remaining capacity and the lending price input by the user are transmitted to the information providing apparatus 2 via the communication network 5.

On the other hand, in step S22, the information providing apparatus 2 receives the transmitted remaining capacity and the lending price. In step S23, based on the received information, the information providing apparatus 2 edits information to be transmitted to the terminal 4 that has issued the information request.

In this information editing, as shown in FIG. 6B, in step S31, the position information of the terminal 4 that has issued the information request is acquired. Also, in step S32, an electric power supply device located near the terminal 4 is searched for. In step S33, an electric power supply device as the target of information transmission to the terminal 4 is selected.

In step S34, information to be provided to the terminal 4 is created based on the processes of steps S31 to S33. In step S35, the provided information is transmitted to the terminal 4. The provided information includes the electric power supply devices selected in step S33 and the position information, the lending price, and the remaining capacity of each device.

Referring back to FIG. 6A, when the information editing in step S23 ends, in step S24, the information in the database 24 is updated to the latest state.

Hence, according to the above-described embodiment, in the information providing system, an electric power supply device located near the terminal and the position, the lending price, and the remaining capacity (providable electric power) of the electric power supply device can be notified in accordance with a request from the terminal. The terminal can display the notified information in a table format or on a map. This allows the user of the terminal to easily acquire information concerning a lendable electric power supply device.

[Summary of Embodiment]

Arrangement 1.

An information providing apparatus (2) for providing information via a network (5) in response to a request from a terminal (4), comprises a reception unit (23) configured to receive, from the terminal via the network, an information request (S1) concerning a lendable electric power supply device (3) configured to supply electric power, an acquisition unit (23) configured to acquire information concerning electric power that can be provided by the electric power supply device and a lending price of the electric power supply device by communicating with the electric power supply device via the network (5), an editing unit (21) configured to edit, based on information acquired by the acquisition unit (23), information to be provided to the terminal that has issued the information request, and a transmission unit (23) configured to transmit, via the network (5), the information edited by the editing unit (21) to the terminal (4) that has issued the information request.

Arrangement 2.

The information request (S1) received by the reception unit (23) includes information representing a position of the terminal (4) that has issued the information request.

Arrangement 3.

The information providing apparatus further comprises a database (24) configured to store information concerning the lendable electric power supply device (3), wherein the database stores at least an identifier for specifying each lendable electric power supply device, lending/borrowing information (40) of each lendable electric power supply device, a location of each lendable electric power supply device (3), specifications of each lendable electric power supply device, and a remaining capacity representing electric power that can be provided by each lendable electric power supply device.

Arrangement 4.

The information edited by the editing unit (21) includes a position, a lending price, and a remaining capacity concerning each lendable electric power supply device located near the terminal that has issued the information request.

Arrangement 5.

The lending price is a price set, based on the lending/borrowing information (40) stored in the database (24), by an owner of the electric power supply device that performs communication via the network (5).

Arrangement 6.

The lending/borrowing information is history information accumulated every time lending is performed, and the history information includes the lending price and used electric power.

Arrangement 7.

The electric power supply device (3) includes an electric generator (38) and a rechargeable battery (38') that can be charged by electric power generated by the electric generator, or includes a rechargeable battery (38') that can be charged.

Arrangement 8.

An information providing system (1) comprises an information providing apparatus (2) of any one of Arrangements 1 to 7, a terminal (4) connected to the information providing apparatus via a network, and an electric power supply device (3) connected to the information providing apparatus via the network (5).

Arrangement 9.

An information providing method in an information providing apparatus (2) for providing information via a network (5) in response to a request from a terminal (4), comprises receiving (S4), from the terminal via the network, an information request concerning a lendable electric power supply device configured to supply electric power, acquiring (S22) information concerning electric power that can be provided by the electric power supply device and a lending price of the electric power supply device by communicating with the electric power supply device via the network, editing (S23), based on the acquired information, information to be provided to the terminal that has issued the information request, and transmitting (S35), via the network, the edited information to the terminal that has issued the information request.

According to Arrangement 1 to Arrangement 9 described above, it is possible to provide information concerning the lendable electric power supply device via the network.

According to Arrangements 2 to 4 described above, it is possible to provide information including the lending price or the remaining capacity of an electric power supply device located near the terminal.

According to Arrangement 5 described above, the lending price can be set by the owner of the electric power supply device.

According to Arrangement 6 described above, the information providing apparatus can hold the history information of lending concerning a lendable electric power supply device.

According to Arrangement 7 described above, as a lendable electric power supply device, a device including an electric generator and a charger and a device including only a charger can be used as targets.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information providing method in an information providing apparatus for providing information via a network in response to a request from a terminal, the information providing apparatus including a database configured to store information concerning lendable electric power supply devices, each of which includes a communication device an input device, and a remaining amount sensor that detects electric power of the associated lendable power supply device, the information including a location of each lendable electric power supply device, the method comprising:
   receiving, from the terminal via the network, an information request concerning a lendable electric power supply device configured to supply electric power, the information request including a position of the terminal;
   selecting lendable electric power supply devices from the information in the database based on the position of the terminal and the location of each lendable electric power supply device in the information;
   transmitting, to each of the selected lendable electric power supply devices by communicating with each of the selected lendable electric power devices via the network, a transmission request concerning electric power that can be provided by each of the selected lendable electric power supply devices and a lending price of each of the selected lendable electric power supply devices;
   detecting, by each of the selected lendable electric power devices, via the remaining amount sensor, the electric power of the associated lendable power device;
   receiving by each of the selected lendable electric power device, via the input device, a lending price inputted by an owner of the associated lendable electric power supply device;
   acquiring, from each of the selected lendable electric power supply devices, information concerning electric power that can be provided by each of the selected lendable electric power supply devices and a lending price of each of the selected lendable electric power supply devices by communicating with each of the selected lendable electric power supply devices via the network;
   editing, based on the acquired information from each of the selected lendable electric power supply devices, information to be provided to the terminal that has issued the information request; and
   transmitting, via the network, the edited information to the terminal that has issued the information request.

2. A system comprising:
   an information providing apparatus which transmits information via a network in response to a request from a terminal,
   lendable electric supply devices, each of which includes a communication device and an input device, and
   a remaining amount sensor that detects electric power of the associated lendable power supply device,
   wherein the information providing apparatus comprises
   a database configured to store information concerning the lendable electric power supply devices, the information including a location of each lendable electric power supply device; and
   a processor configured, by executing a program, to:
   receive, from the terminal via the network, an information request concerning a lendable electric power supply device configured to supply electric power, the information request including a position of the terminal;
   select lendable electric power supply devices from the information in the database based on the position of the terminal and the location of each lendable electric power supply device in the information;
   acquire, from each of the selected lendable electric power supply devices, information concerning electric power that can be provided by each of the selected lendable electric power supply device and a lending price of the electric power supply device by communicating with the electric power supply device via the network, wherein the lending price is inputted through the input device by an owner of the associated lendable electric power supply device and the electric power is detected, via the respective remaining amount sensor of each of the selected lendable power supply devices;

edit, based on information acquired from each of the selected lendable electric power supply devices, information to be provided to the terminal that has issued the information request; and transmit, via the network, the information edited based on information acquired from each of the selected lendable electric power supply devices to the terminal that has issued the information request.

3. The system according to claim 2, wherein the processor is configured, by executing the program, to transmit, to each of the selected lendable electric power supply devices by communicating with the electric power supply device via the network, a transmission request concerning the electric power and the lending price.

4. The system according to claim 2, wherein the database stores at least an identifier for specifying each lendable electric power supply device, lending/borrowing information of each lendable electric power supply device, a location of each lendable electric power supply device, specifications of each lendable electric power supply device, and a remaining capacity representing electric power that can be provided by each lendable electric power supply device.

5. The system according to claim 4, wherein the lending/borrowing information is history information accumulated every time lending is performed, and the history information includes the lending price and used electric power.

6. The system according to claim 2, wherein the information edited based on information acquired from each of the selected lendable electric power supply devices includes a lending price and a remaining capacity concerning each of the selected lendable electric power supply devices which are located near the terminal that has issued the information request.

7. The system according to claim 2, wherein the electric power supply device includes an electric generator and a rechargeable battery that can be charged by electric power generated by the electric generator, or includes a rechargeable battery that can be charged.

* * * * *